United States Patent
Mortazavi et al.

(10) Patent No.: US 7,480,816 B1
(45) Date of Patent: Jan. 20, 2009

(54) FAILURE CHAIN DETECTION AND RECOVERY IN A GROUP OF COOPERATING SYSTEMS

(75) Inventors: Masood S. Mortazavi, San Jose, CA (US); Shreedhar Ganapathy, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 533 days.

(21) Appl. No.: 11/197,690

(22) Filed: Aug. 4, 2005

(51) Int. Cl.
*G06F 11/00* (2006.01)

(52) U.S. Cl. .................. 714/4; 714/7; 714/10; 714/11; 109/223

(58) Field of Classification Search ............... 714/4, 714/7, 10, 11
See application file for complete search history.

(56) References Cited

U.S. PATENT DOCUMENTS

| | | | |
|---|---|---|---|
| 5,796,934 A | 8/1998 | Bhanot et al. | |
| 5,805,785 A | 9/1998 | Dias et al. | |
| 5,812,751 A | 9/1998 | Ekrot et al. | |
| 5,996,086 A * | 11/1999 | Delaney et al. | 714/4 |
| 6,523,130 B1 | 2/2003 | Hickman et al. | |
| 6,609,213 B1 | 8/2003 | Nguyen et al. | |
| 6,922,796 B1 * | 7/2005 | Matena et al. | 714/48 |
| 6,944,788 B2 * | 9/2005 | Dinker et al. | 714/4 |
| 7,039,827 B2 * | 5/2006 | Meyer et al. | 714/4 |
| 7,076,691 B1 * | 7/2006 | Dobberpuhl et al. | 714/13 |
| 7,330,996 B2 * | 2/2008 | Coteus et al. | 714/3 |
| 2002/0091969 A1 | 7/2002 | Chen et al. | |
| 2002/0124013 A1 | 9/2002 | Irit et al. | |
| 2003/0051187 A1 * | 3/2003 | Mashayekhi et al. | 714/4 |
| 2003/0163755 A1 | 8/2003 | Meyer | |
| 2003/0177150 A1 | 9/2003 | Meyer | |
| 2004/0025092 A1 * | 2/2004 | Babutzka et al. | 714/48 |
| 2004/0243650 A1 | 12/2004 | McCrory et al. | |
| 2006/0047776 A1 * | 3/2006 | Chieng et al. | 709/217 |

OTHER PUBLICATIONS

"Fastpath Optimizations for cluster Recovery in Shared-Disk Systems", Randal Burns, Proceedings of the 2004 ACM/IEEE Conference on Supercomputing, Publishers: IEEE Computer Society; 9 pages.

* cited by examiner

*Primary Examiner*—Scott T. Baderman
*Assistant Examiner*—Loan Truong
(74) *Attorney, Agent, or Firm*—Robert C. Kowert; Meyertons, Hood, Kivlin, Kowert & Goetzel, P.C.

(57) ABSTRACT

A cluster or group of cooperating systems may implement failure chain detection and recovery. The group may include multiple nodes and each node may include a group management services (GMS) module that in turn may include a group communications mechanism to detect cluster membership events. Each GMS module may maintain an identically ordered view of the current group membership. When a member of the group fails, the member that joined the group immediately after the failed member, according to respective join times, may be selected to perform recovery operations for the failed member. If a group member fails while performing recovery operations for another failed member, the next member in the group (according to respective join times) may be selected to perform recovery for that node and may also perform recovery operations for the original failed node as well.

19 Claims, 12 Drawing Sheets distributed state cache
800

| member name | member ID | join time | recovering for | recovery state |
|---|---|---|---|---|
| server 1 | B | 00:00:00 | | |
| server 2 | D | 00:01:43 | B | RECOVERY IN PROGRESS |
| server 3 | G | 00:01:52 | D | RECOVERY SERVER APPOINTED |
| server 4 | F | 00:03:44 | | |
| server 5 | C | 00:07:00 | | |
| server 6 | E | 01:43:22 | | |
| server 7 | A | 03:00:11 | | |

810 — member name
820 — member ID
830 — join time
840 — recovering for
850 — recovery state

FIGURE 8

FAILURE CHAIN DETECTION AND RECOVERY IN A GROUP OF COOPERATING SYSTEMS

BACKGROUND

1. Field of the Invention

This invention relates to computer systems, and more particularly to detecting and recovering from failures in a group of systems.

2. Description of the Related Art

Distributed applications are often implemented as part of commercial and non-commercial business solutions for an enterprise. For example, a company may leverage the use of an enterprise application that includes various databases distributed across multiple computers. Applications of this type, which support E-commerce, typically support hundreds or thousands of requests simultaneously during periods of peak utilization. For scalability and fault tolerance, the servers running such applications may be clustered.

FIG. 1 illustrates a networked computer system including a server cluster 100, according to prior art. Clients 110 may be coupled to cluster 100 through network 120. Clients 110 may initiate sessions with application components running on servers 140. Load balancer 130 may distribute requests from clients 100 to servers 140 to "balance" the total workload among the servers. In some cases, load balancing may amount to nothing more than the round-robin assignment of new requests to cluster members. In other cases, load balancer 130 may have access to data concerning the current workload of each server 140. When a new request is received, load balancer 130 may use this data to determine which server has the "lightest" workload and assign the new request to that server. Regardless of the distribution algorithm used by the load balancer 130, the capacity of the application component running on the servers 140 of the cluster is greater that if it were limited to only a single server, and most architectures for cluster 100 include scalability to allow for increasing capacity by adding additional servers 140 to the cluster.

Another desirable characteristic of an application component executing on a server cluster is high availability. For an application component running in a non-clustered environment, the failure of its server makes the component unavailable until the server is repaired or replaced. This loss of service may be very undesirable for an enterprise, particularly if the function being performed by the application component is, for example, registering orders for products or services. If the application component is executing on a cluster, one or more servers 140 within the cluster can fail, and the application may continue to provide service on the remaining active servers, although at a reduced capacity. This attribute of a clustered server environment is called "failover", and it can be implemented in a variety of ways. In some cases, the load balancer 130 may determine that a given server 140 has failed and simply not assign any further work to that server. This insures that new requests will receive service, but does nothing for work that was in-process on the failed server.

Many cluster architectures have been formulated to address the need for graceful failover of cluster members to attempt to minimize the impact of individual server failures on end users. In most cases, graceful failover within a cluster requires the servers 140 to be "cluster-aware" to the point of being able to detect the failure of fellow cluster members, and in some cases each server may be able to resume the processing of jobs that were executing on the failed server at the time it failed. The increase in complexity for each server 140 to support this level of graceful failover may be quite large in terms of the design, verification, and maintenance of the additional functionality.

Another aspect of cluster management is the reintroduction of recovering/recovered servers into the cluster. From an enterprise point of view, it is desirable to return a server 140 to use as quickly as possible after it has failed. In some instances, a failed server may be recovered by simply performing a server restart on the failed unit. Depending upon the amount of time needed for the cluster to recover from a server failure, the failed unit may be restarted before the cluster has completely recovered from its failure. This type of situation can lead to quite complex problems in maintaining system consistency.

SUMMARY

Various embodiments of a system and method for providing failure chain detection and recovery in a server cluster or process group are disclosed. The group cluster may include a plurality of nodes and each node may include a server or process configured to execute one or more applications as part of the cluster. In one embodiment, the process group may be an application server cluster in which each node runs an application server. For instance, application(s) running on each node may be the business logic component of a multi-tier application for which the application server may provide services. Each node may also include a group management service (GMS) client module, including a group communications mechanism to detect group membership. In response to detecting a node failure, the GMS client may determine whether it is the responsibility of the server in its node to recover for the failed node, and if so, the GMS client may notify its server to perform the required recovery actions.

In one embodiment, each GMS client may maintain an identical, ordered view of the current group membership provided by a group communications module. When a member of the group fails, the member that joined the group immediately after the failed member may be selected to perform recovery operations for the failed member, according to some embodiments. Thus, the group membership information maintained by GMS clients may be ordered using the respective time that each member joined the group. For example in a three node cluster where node 1 joined first, node 2 joined second and node 3 joined last, the selection of the recovery server based on the identity of the failed server may operate as follows: if node 1 fails, node 2 performs the recovery; if node 2 fails, node 3 performs the recovery; and if node 3 fails, node 1 performs the recovery. In alternative embodiments, the recovery server may be determined based on workload, a round-robin algorithm, randomly, or through a wide variety of other methods.

When the server starts a GMS client thread, it may include a callback function or other means for initiating server recovery actions, according to various embodiments. When the GMS informs the server that it needs to recover for a failed node, the server may perform the required recovery functions and when it is finished, may notify the GMS of recovery action completion.

In some embodiments, the group may include cluster/group state data kept in storage that is accessible to all group members and updated by the GMS modules of the cluster nodes. In one embodiment, each GMS client module may maintain its own version of a distributed, shared group state data. The GMS modules may use this table to "fence" a failed member to prevent the failed node from re-joining the cluster until the recovery for the failure has completed. As a part of its startup protocol, each GMS module may be configured to access the cluster/group state information to determine whether any recovery actions are in progress for its node. If such actions are occurring, the GMS may delay the entry of its node into the cluster until the recovery actions have completed.

Additionally, a group member may fail while performing recovery operations for a previously failed node that itself may have been performing recovery operations for yet another failed node. Thus failures may cascade forming a failure chain. In one embodiment, when a member fails while performing recovery operations, the next member in the group (according to respective join times) may be selected to perform recovery for that node and may, in some embodiments, also perform recovery operations for the original failed node as well.

In some embodiments, the cluster/group state data may be modified to reflect which members may be performing recovery actions for failed nodes. For example, when a recovery server has completed recovery actions, its GMS module may update the group state data to indicate that the recovery server has completed performing recovery actions for the failed node. This may allow a recovering node to attempt to rejoin the cluster.

BRIEF DESCRIPTION OF THE DRAWINGS

FIG. 8 illustrates one embodiment of recovery state information stored in a distributed state cache.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
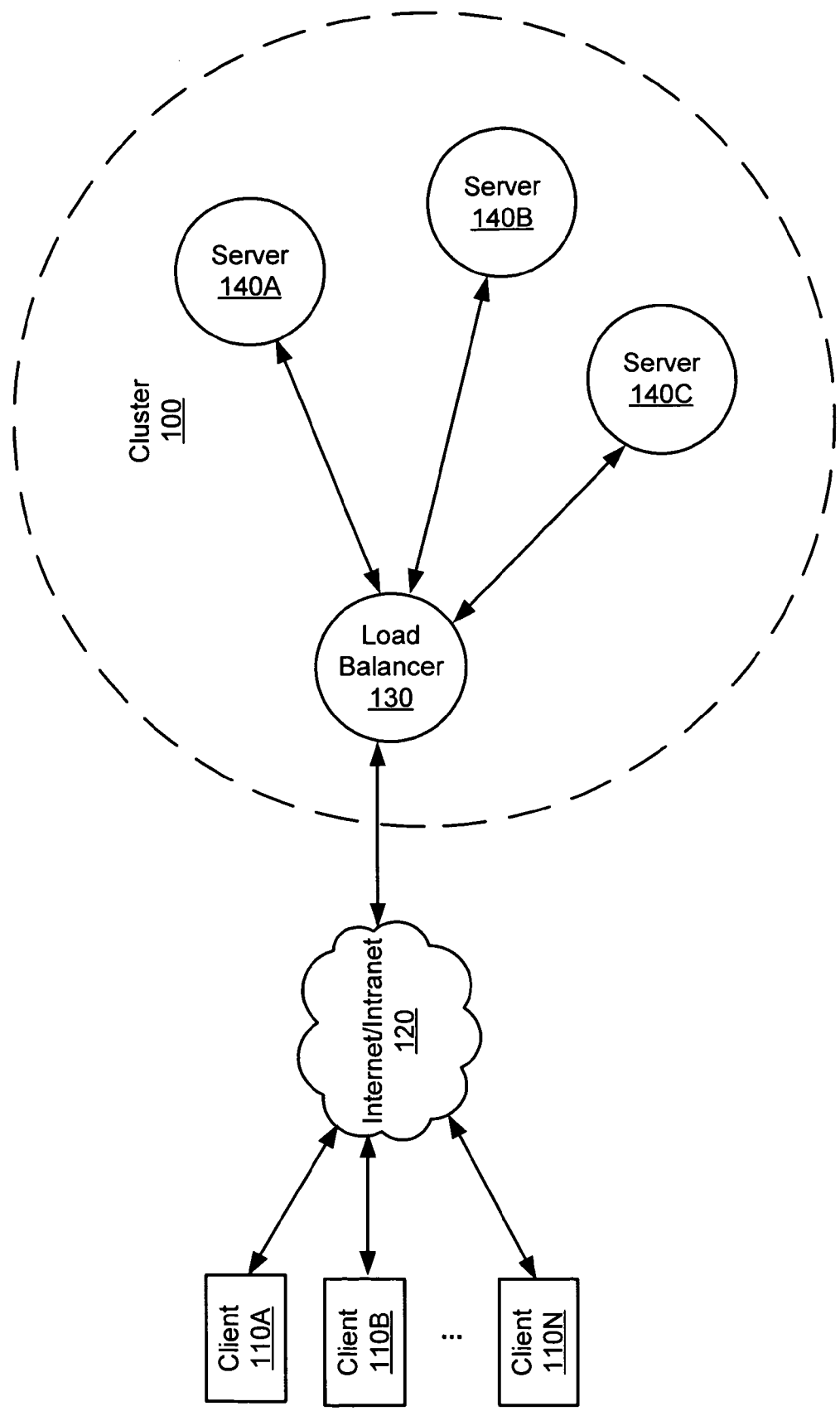
FIG. 1 illustrates a networked computer system including a typical server cluster.
Figure 2:
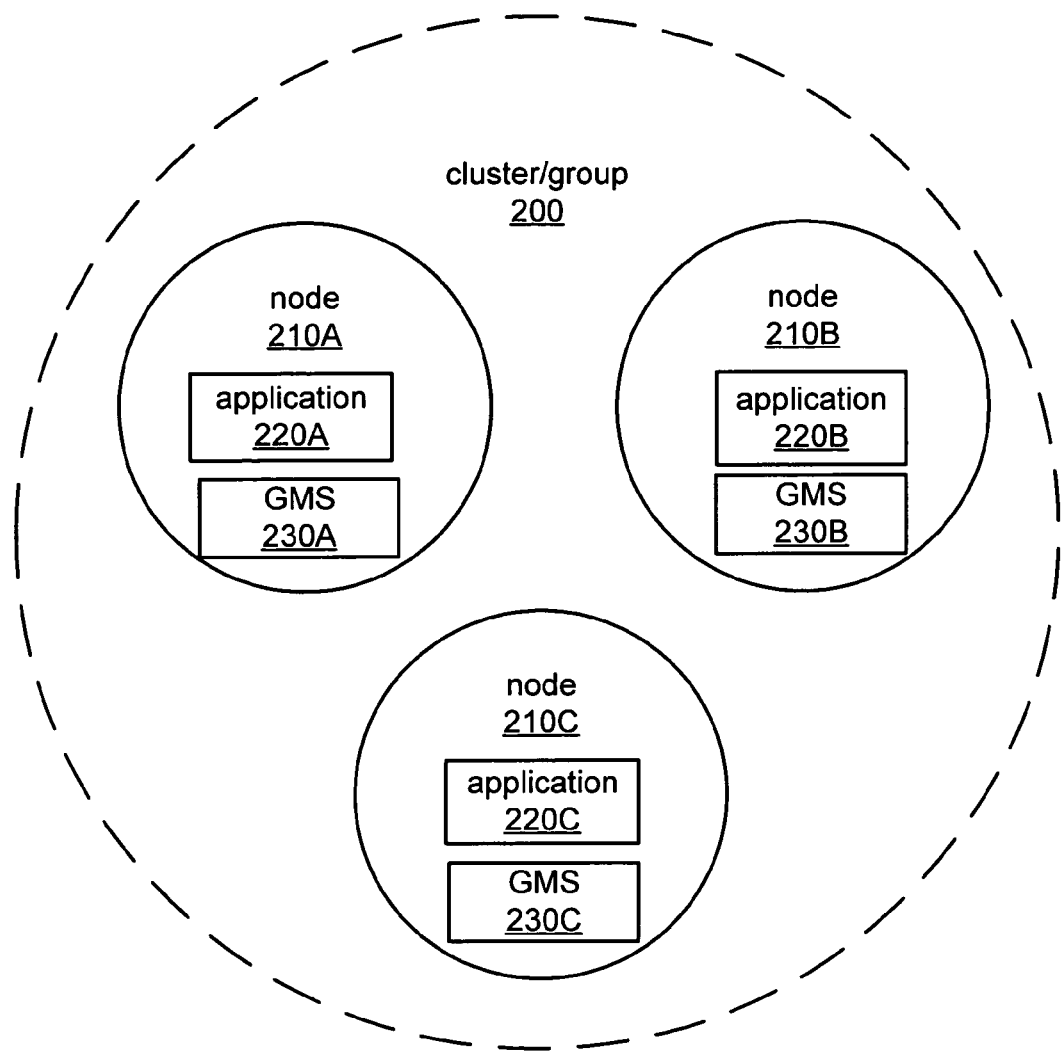
FIG. 2 illustrates the components of a server cluster, according to one embodiment.

FIG. 2 illustrates the components of a server cluster/group 200 for which failure chain detection and recover may be implemented, according to one embodiment. Cluster/group 200 may comprise two or more nodes 210. Please note that the terms cluster and group may be used interchangeably herein. Additionally, the terms member and node may also be used interchangeably herein. In some embodiments, a node 210 may be a hardware platform/computer system executing one or more software programs. As illustrated, each node 210 may be running a server 220 and a group management service (GMS) module 230. A server 210 may provide various functions according to the specific application. In one instance, it may provide Web pages in response to requests from clients received over the Internet. In another case, server 210 may provide services to a distributed application component executing on its node. Services provided to a distributed application component by the server may include: naming and directory services, database connectivity, messaging services, and transactional services. Generally, servers 220 may perform any server functionality in a cluster configuration.

The GMS 230 may be a pluggable module that provides a delegated means for groups of processes (e.g. server clusters) to detect failures of group members, to initiate failure recovery, and to fence failed processes from rejoining the group. When plugged into a server 220, GMS 230 may provide the ability for the application to be signaled to perform recovery oriented actions on one or more failed group members. In some embodiments, the GMS layer 230 may provide a group communications environment based on the open-source JGroups group communication toolkit. For example, the GMS 230 module may, in one embodiment, augment a stack of micro-protocols implemented in modular fashion, in JGroups. Each server 220 may start the GMS module 230 to provide group services such as fault detection, recovery initiation, and failure fencing. Group management services modules 230 may be configured as pluggable modules with a standardized interface. This may allow group membership functionality (e.g. failure detection, membership event management, cluster joining/leaving/rejoining management, etc.) to be separated from the server design. Thus, servers 220 and applications running on servers 200 may be designed and debugged independently from GMS modules 230. GMS modules 230 may be "plugged in" to each server node to handle group management services.

Figure 3:
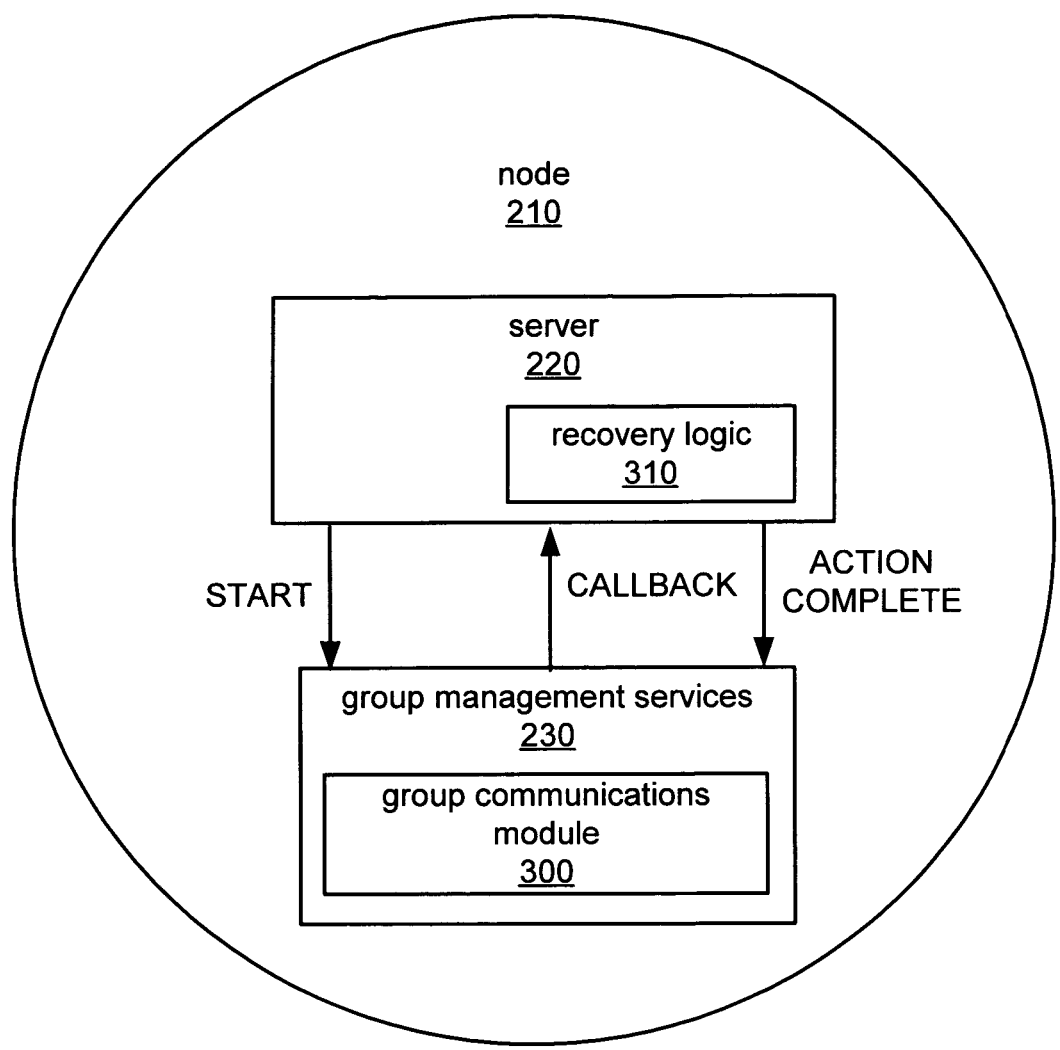
FIG. 3 illustrates the components of a cluster node, according to one embodiment.

FIG. 3 illustrates the components of a cluster node 210, according to one embodiment. The GMS module 230 may include a group communications module 300. During startup, the server 220 may issue a start command that includes a provision for a callback allowing the server to be notified of certain group membership events, according to certain embodiments. The details of group dynamics may be handled within the GMS module 230 separate from the server until the server needs to be involved (such as through the callback mechanism). The GMS module 230 may be configured to monitor and interpret group events. For instance, when GMS module 230 detects an event requiring recovery, it may trigger recovery logic 310 on the overlying server via the callback mechanism. In response, recovery logic 310 may take appropriate action to fail-over for another server of the cluster that has failed. In one embodiment, recovery logic 310 may acquire application state information for the failed cluster member so that its server may resume requests that were being handled by the failed server to so that its server may perform recovery operations for the failed member. The GMS module 230 may also manage changes to the group involving additions and failures by maintaining a coherent set of cluster state data. In this context, "failure" may encompass unplanned (abortive shutdown) and abnormal (process, network, or machine-based failure) termination of member functionality.

Figure 4:
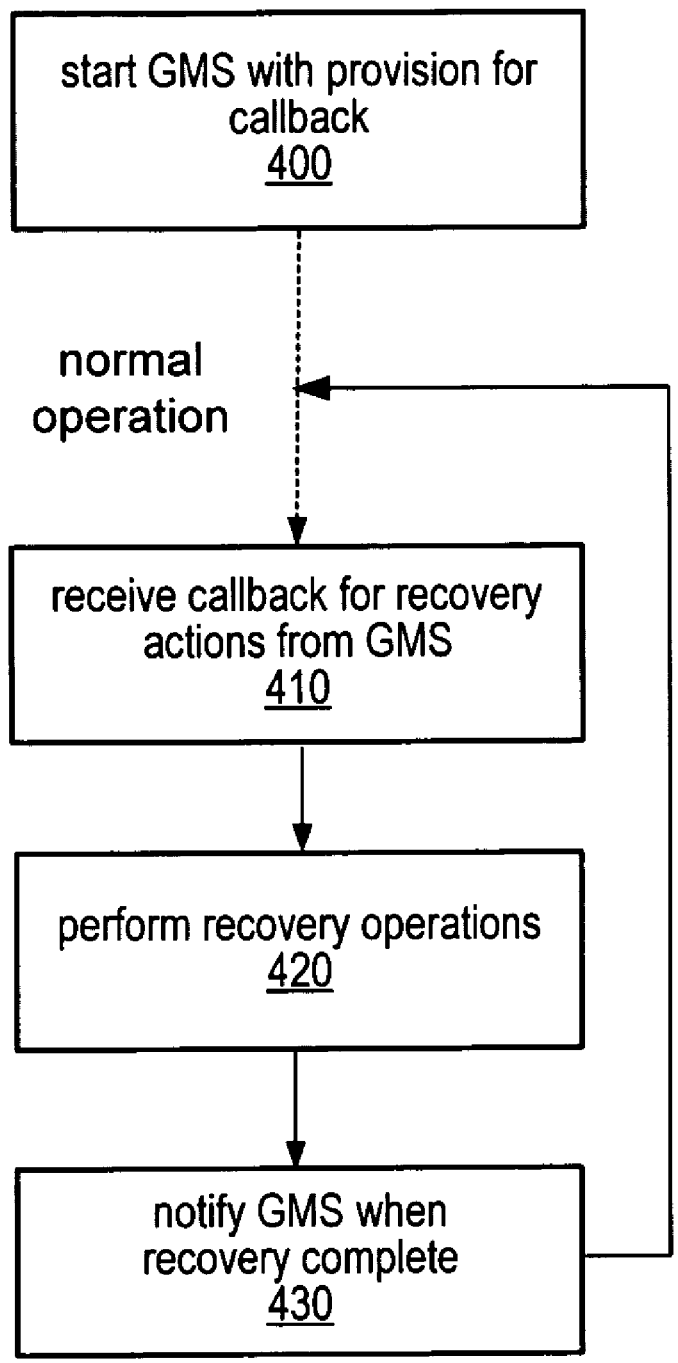
FIG. 4 is a flowchart for operation of an application overlying a GMS module, according to one embodiment.

FIG. 4 is a flowchart illustrating one embodiment for failure recovery, according to one embodiment. At block 400, an overlying server or application may initiate GMS on a separate thread (e.g., a thread belonging to a particular thread group devoted to group communications) in order to participate as a member of a group of processes (e.g., a server cluster). Thereafter, the server or application performs normal operations, and is capable of responding to a callback from the GMS module when recovery oriented action needs to be taken. In one embodiment, the server overlying the GMS module may be an application server and the cluster being managed may be a group of application server nodes.

As shown in block 410, the server or application may receive a recovery callback from the GMS indicating not only that there has been a failure among the group processes, but also that this particular server or application instance has been selected to perform recovery actions for the failed member. The recovery callback itself may initiate one or more recovery functions included in the server or application, as indicated by block 420. After the recovery actions have been performed, the server or application may notify GMS that the recovery is complete, as depicted in block 430.

Figure 5:
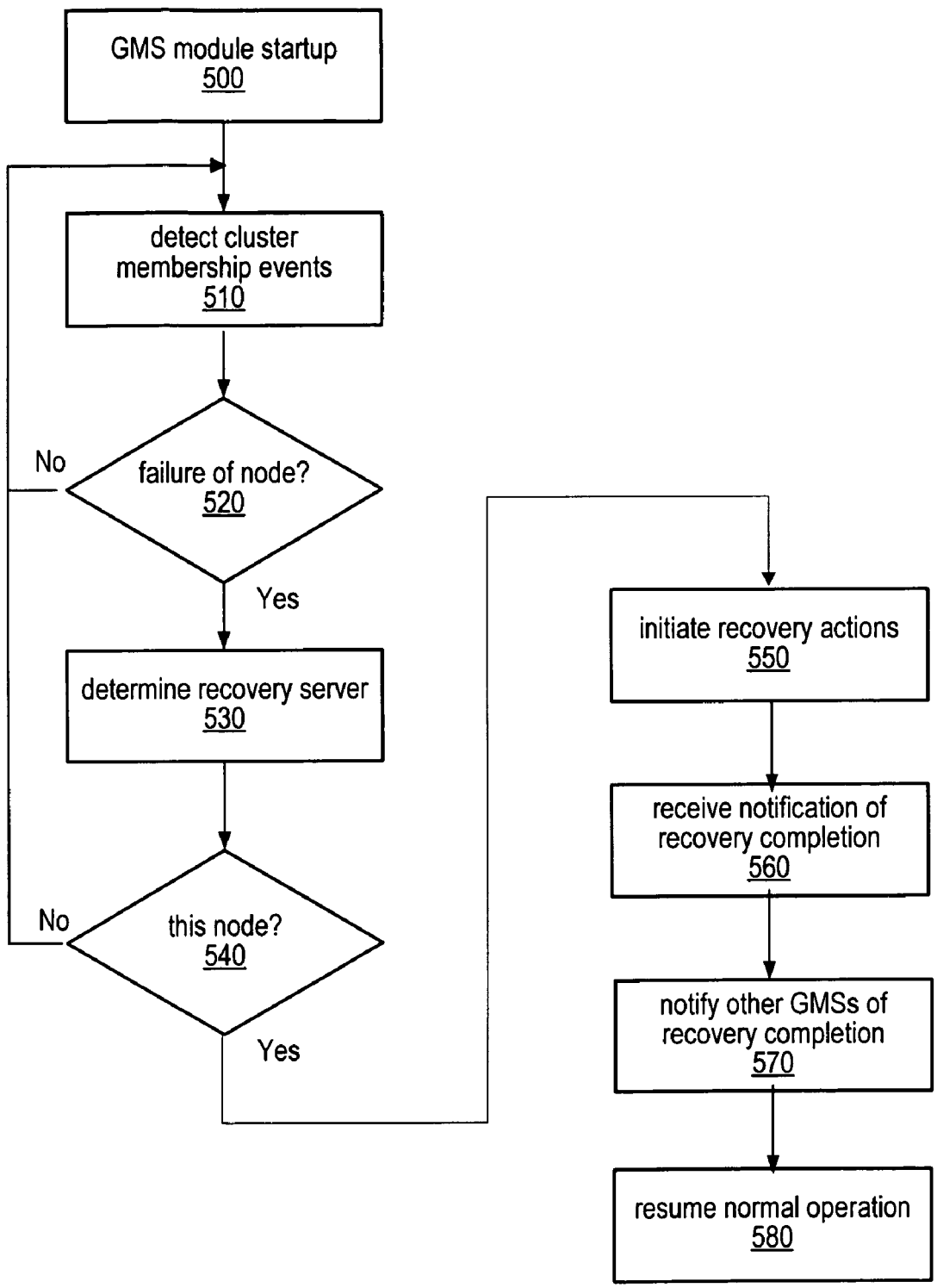
FIG. 5 is a flowchart for GMS module operation, according to one embodiment.

FIG. 5 is a flowchart illustrating one embodiment for a method of GMS module operation including performing failure chain detection and recovery. Once initialized as illustrated by block 500, a GMS module may listen for specific group events such as member additions and failures, as illustrated by block 510. These group events may, in some embodiments, be referred to as "view changes" in group-communications parlance. In some embodiments, the set of protocols included in the group communications module may provide certain properties of virtual synchrony. For example, messages may be sent and received within the scope of views. Each group member may have a view, which may be an ordered set of the group members that constitute the current membership. When the membership changes, a new view may be installed by all members. Views may be installed in the same order at all members. The set of messages between two consecutive views may be the same at all receivers. Messages sent in the scope of view V1 may be received by all non-faulty members in view V1.

Upon discovering that it can no longer communicate with a particular cluster member, the group communications module may, in some embodiments, send a message, such as a reliable multicast message, to all group communications modules in the current view indicating the inability to communicate with the node. In one embodiment, the group communications module may include an updated view following confirmation of the failure or unreachability of a member. The GMS modules may use this updated view to determine that a cluster node has failed and also to determine the identity of the failed node, as indicated by decision block 520. Once a node failure has been established, each GMS module may determine which node should become the recovery server for the failed cluster member, as shown in block 530, according to a selection algorithm. For example, in some embodiments, a chronological successor algorithm may be used in which the next group member that joined the group after the failed member joined may be selected to perform recovery operations for the failed member.

Once a GMS module has determined that its corresponding application server is to become the recovery server, as indicated in block 540, it may initiate the required recovery actions, as shown in block 550. As described above, the GMS module may initiate recovery actions via a callback function to the server or application executing on the same node. The GMS may then await a recovery complete notification, as indicated in block 560 and described above. In response to receiving the recovery complete notification, the GMS module may notify the other GMSs that the recovery actions for the node failure have completed, as illustrated in block 570. In one embodiment, this notification may take the form of an explicit message broadcast to the GMS in all cluster nodes, while, in other embodiments, it may be performed by updating cluster state data in commonly accessible storage.

Figure 6:
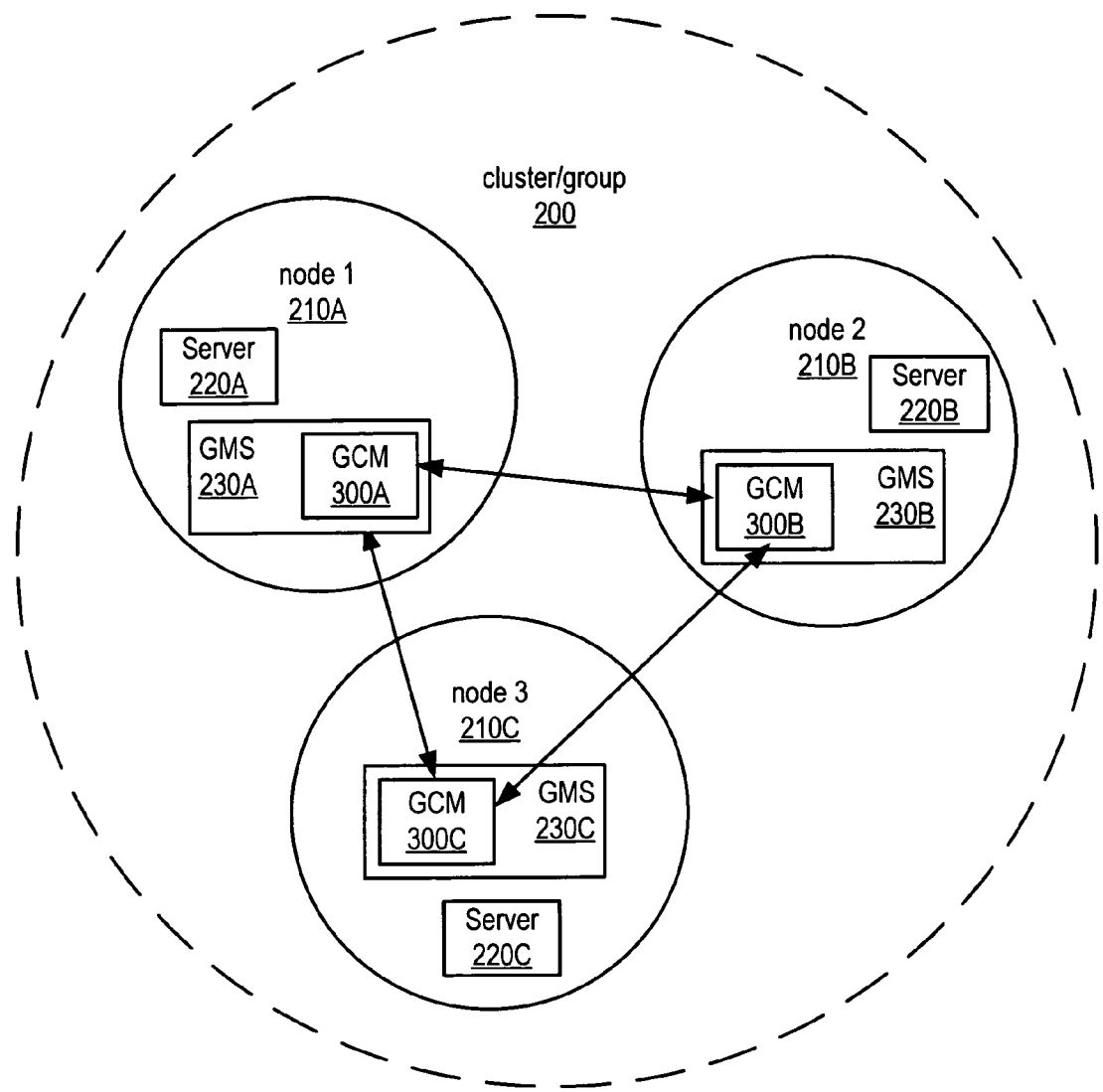
FIG. 6 illustrates components of a server cluster, according to one embodiment.

As noted above, the algorithm used by GMS modules to determine a recovery server may involve selecting the member according the ordering of the members in the group state data, according to some embodiments. Each GMS may have an identically ordered view of the current group membership. In one embodiment, the group members may be ordered chronologically according to their respective join dates. FIG. 6 is a representation of the cluster of FIG. 2 in which the member nodes have been explicitly ordered. According to one embodiment, the identity of the failed cluster member may be determined by each GMS 230. The algorithm used may stipulate that recovery is to be performed by the next member following the failed member in the ordered membership view that existed before the failure occurred. Thus, in one embodiment, the member that joined the group immediately after the failed member joined may be selected to perform recovery operations for the failed node. Given that node 2 follows node 1, node 3 follows node 2, and node 1 follows node 3, the selection of the recovery server based on the identity of the failed server may operate as follows: if node 1 fails, node 2 performs the recovery; if node 2 fails, node 3 performs the recovery; and if node 3 fails, node 1 performs the recovery. In alternative embodiments, the recovery server may be determined based on workload, a round-robin algorithm, randomly, or through a wide variety of other methods.

In some embodiments, recover actions may initiated using a callback interface, as described above. In one embodiment, a FailureRecoverySignal object, which may encapsulate the token of the failed cluster member, may be passed via the callback mechanism. The RecoverySignal object may implement methods allowing for locking certain resources to protect the integrity of the recovery operations. A GMSFactory object may provide the basis for GMS/application pluggability through an appropriately named operation getGMSModule. An ActionFactory/Action/Signal triplet may provide the basis for communicating events of interest between GMS and the application employing GMS. In one embodiment, ActionFactory(ies) and Action(s) may be implemented by the application or server layer while Signal(s) may be implemented by the GMS module layer. The implementation of ActionFactory produces the Action object. The implementation of Action consumes a Signal by first acquiring it prior to performing any recovery operation and releasing it after any recovery operation.

In one embodiment, the entry point for the GMS module may be a class that implements the java.lang.Runnable interface and the GroupManagementService interface. This class may use JGroups API and building blocks to participate in a predefined group corresponding to an application server cluster, and receive notification of group events. A calling class, such as the application server initialization code, may instantiate and start the GMS thread which may execute a "join" operation to the predefined group name and may perform actions to enable the thread to listen to group events so that appropriate callback actions can consequently be issued. Example code for a GMS module is shown below. Note that some implementation details are omitted, and private/protected methods have been shown for the sake of clarity.

```
/**
 * Registers the required Server Identity Token, group
   name,
 * type of the member, and configuration properties
 * @param serverToken
 */
public GroupManagementServiceImpl(final String serverToken,
   final String groupName,
   final GroupManagementService.MemberType membertype,
   final Properties properties) { ... }
// Implementation of Runnable interface
public void run( ){ ... }
//end implementation of Runnable interface
//Implementation of GroupManagementService interface
/**
Register an action factory for group event notifications
 * @param actionFactory
 */
public void addActionFactory(final ActionFactory actionFactory) { ... }
/**
 * Returns an implementation of GroupHandle
 * @return com.sun.enterprise.ee.cms.GroupHandle
 */
public GroupHandle getGroupHandle( ) { ... }
/**
 * Sends a shutdown command to the GMS indicating that
   the parent thread
 * is about to be shutdown as part of a planned shutdown
   operation
 */
public void shutdown( ) { ... }
/** for this serverToken, update the Distributed State
Cache with the key and value */
public void updateMemberDetails (final String memberToken,
   final Serializable key,
   final Serializable value)
   throws GMSException { ... }
/**
 * for this serverToken, use the map to derive key value pairs
 * that constitute data pertaining to this member's details
 * @param serverToken—member token id for this member.
 * @param keyValuePairs—a Map containing key-value
   pairs
 */
public void setMemberDetails (final String serverToken,
   final Map<? extends Object, ? extends Object> keyValuePairs)
   throws GMSException { ... }
//end implementation of GroupManagementService interface
   private void join( ) throws GMSException { ... }
/**
 * Called when the application layer is shutting down and
    this member needs to leave
 * the group formally for a graceful shutdown event.
 */
private void leave( ) { ... }
private void removeAllActionFactories( ) { ... }

}
```

In the code snippet above, the constructor may expect identifiers for the parent process instance, the cluster, the role the member is playing such as CORE or SPECTATOR, and a set of configuration properties. The server token of the parent process instance may be similar to the server "name". Any initialization information such as location of transaction logs, or IIOP end points, and such other server properties that a recovery server may require, may be passed in using the operation setMemberDetails( ) or updateMemberDetails( ) as appropriate. These operations may have the effect of sharing such date through the shared distributed cache or a commonly accessible storage. The parent process instance may register interest for being called, on occurrence of specific group events through the addActionFactory operation. This registration may pass in an instance of FailureRecoveryActionFactory implementation so that this implementation may be called by the GMS module when, on occurrence of failure, a recovery selection takes place for this parent process instance. The FailureRecoveryActionFactory implements an operation to produce a FailureRecoveryAction, called produceAction. The GMS module may produce such FailureRecoveryAction using the above mentioned factory and call the FailureRecoveryAction's operation consumeSignal in order to pass it the FailureRecoverySignal. The FailureRecoverySignal constitutes the notification that the parent process instance may perform recovery operations and may encompass the server token of the failed group member and operations to retrieve configuration and locational properties of such failed group member.

Figure 7:
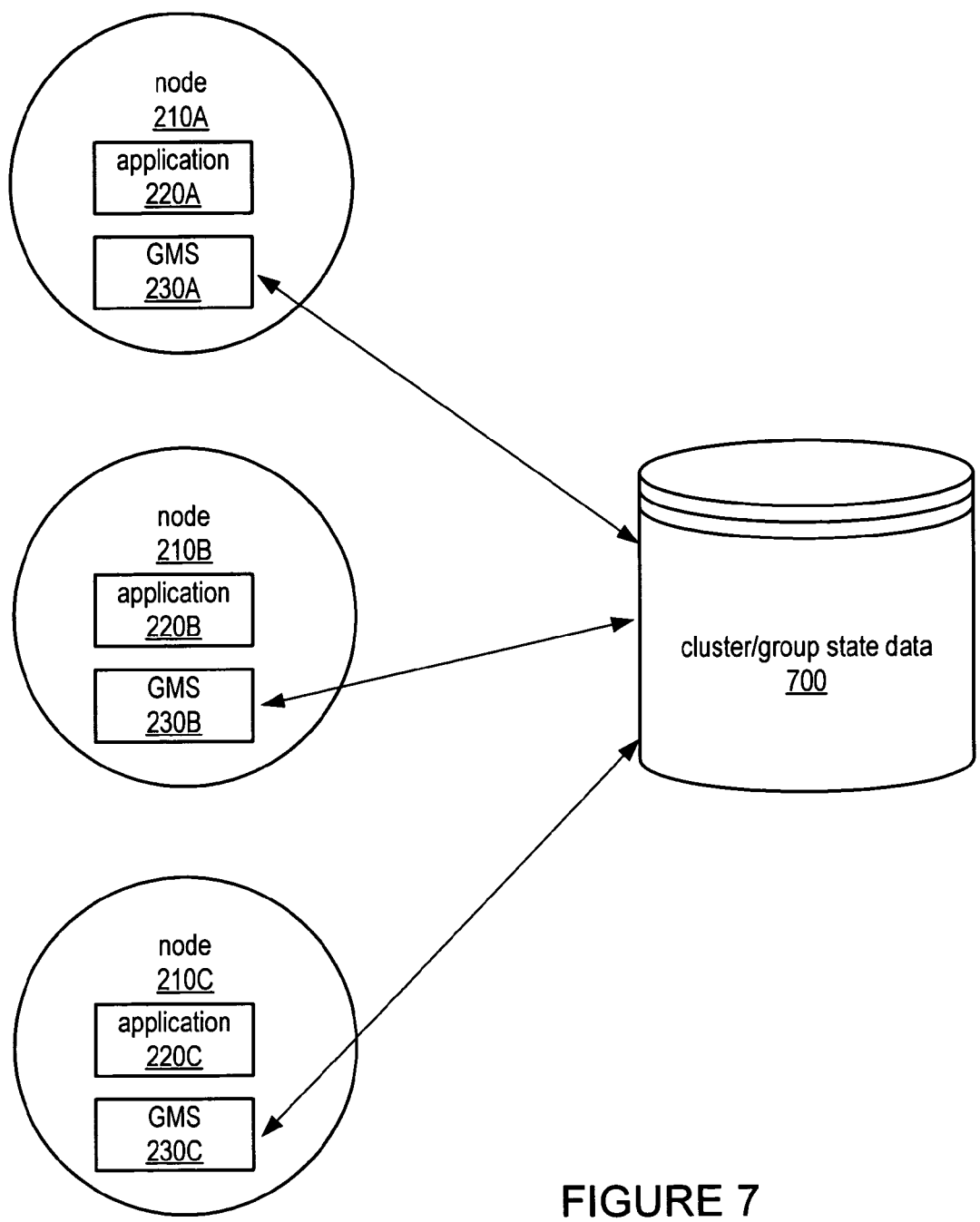
FIG. 7 illustrates a mechanism for protecting a failure recovery operation, according to one embodiment.

The GMS module may also include a mechanism for protecting a failure recovery operation using cluster recovery state data, as illustrated in FIG. 7. This protection may be referred to as "failure fencing". The intention is to 'fence' off a recovering server to prevent its rejoining the processing cluster until the state of the cluster is such that its rejoining causes no inconsistencies. Such inconsistencies might arise, for example, if a server that had failed attempted to re-insert itself into the cluster while the recovery server is still engaged in recovery action. In one embodiment, this situation may be prevented by the cluster members refusing to participate in any rejoining process until the failure recovery process has completed. In another embodiment, a server that is starting or restarting may check the cluster state data 700 to determine if rejoining is permissible. In this method, the onus of protecting the integrity of the cluster state may be placed on the server requesting membership impacting functional members only minimally. As noted above, the group state data may be stored in shared data storage accessible to all group members in one embodiment, while in other embodiments each individual GMS module may store its own version or instance of the group state data while ensuring that all changes to the data are propagated to the other GMS modules of the group. Thus, in some embodiments, the group state data may be distributed and shared among the various GMS modules of the group.

This latter approach to failure fencing/membership gating may not affect the application server core functionality or recovery callback functionality. In other words, the fencing/gating functionality may be hidden from the application server tier. However, from the perspective of managing the gating process during recovery operations, the application server recovery layer 220 may trigger changes to the state of the gate through its interaction with the recovery signal. For example, when a recovery action is initiated by the GMS, the invocation of the FailureRecoverySignal object's acquire( ) and release( ) methods may cause the GMS to close and open the gate for the failed server to rejoin the cluster by indicating changes to the state of the cluster 700 that can be monitored by non-members. Coupled to this universally accessible cluster state data may be a protocol that determines the conditions under which a server may attempt to join a cluster.

In some embodiments, a shared and synchronized distributed state cache (DSC) may be maintained by GMS instances to record and store recovery state information, as described above. The DSC may be used as a repository for recording recovery state transitions and/or other information that may assist applications in performing recovery tasks. For example, items that may be recorded in the DSC may include indications that a recovery server has been appointed and that a recovery is in progress. When a recovery leader is selected, an entry may be made in the DSC to record the transition to that state of the recovery process. In some embodiments, the distributed state cache may be part of the group state data described above. In other embodiments, the distributed state data may include the group state data.

FIG. 8 illustrates one embodiment of recovery state information stored in a distributed state cache 800. The distributed state cache (DSC) may, in some embodiments, reside in cluster state data 700 and may be accessed by all cluster members. In other embodiments, each group member may maintain its own copy of distributed state cache 800. The information stored in distributed state cache 800 may include various fields, such as a member name 810, member ID 820, and join time 830. A record in the distributed state cache (DSC) 800 may include the name 810 and the member ID 820 of the client component (or server) and time of joining 830 of the recovery leader. Distributed state cache 800 may also include a field, such as "recovering for" 840, indicating which members are performing recovery operations for failed members. For example, as illustrated in FIG. 8, server 3 (member ID: G) is performing recovery for server 2 (member ID: D). Member ID 820 and join time 830 may provide information for establishing the chronological successor algorithm, as described above. distributed state cache 800 may also include the current recovery state of each member, such as in "recovery state" field 850. Additionally, the information in the "recovering for" field may indicate failure chains, the details of which are described below.

As noted above, in some embodiments, distributed state cache 800 may also include a timestamp recording when a member was appointed the recovery leader after detection of a failure. In some embodiments, distributed state cache 800 may enable all members to access the recovery record and state information.

Distributed state cache 800 may be modified under certain conditions, according to some embodiments. For instance, when a recovery server begins a recovery action for a failed cluster member, its GMS may enter the designation of the failed server in the field in the "recovering for" 840 column corresponding to the recovery server. In the example of FIG. 8, the data in distributed state cache 800 indicates, that server 1 (ID: B) has failed and that server 2 (ID: D) has begun a recovery action on its behalf. A recovery server may, in some embodiments, be configured to remove the designation of the failed server from its RecoveringFor 840 column after completing a recovery action. Additionally, when a server joins or rejoins a cluster group, its GMS may write its designation into the appropriate location in the member name 810 column, according to one embodiment. When a server restarts after a failure, its GMS module may check distributed state cache 800 to determine whether another server is still performing its recovery. In one embodiment, the GMS module may delay a server rejoining the cluster until any ongoing recovery is complete.

When determining the recovery leader or, in general, when determine which member should recover for a failed member, every (non-failed) member of the group may be configured to examine the information in distributed state cache 800 and determine, using the join time, which member should be assigned to recover the failed system. Thus, in some embodiments, the "recovering for" field may be updated multiple times, once by each (non-failed) member, to ensure that the information is recorded even if another of the members should fail. Otherwise, if only one member was configured to update the "recovering for" information, that member may fail and the recovery information might be lost. In some embodiments, every group member may be configured to use the same method or algorithm for determining which member should recover for a failed member. Thus, all members may be configured to determine the same recover leader based on the information in distributed state cache 800. For instance, in one embodiment, a chronological successor algorithm may be used in which the member that joined the group next (chronologically) after the failed member is assigned to be the recovery leader for performing recovery operations on the failed member. In the example illustrated by FIG. 8, the members are listed in the order that they joined the group. For instance, server 2 recovers for server 1, server 3 recovers for server 2 and so on. In the event that the member that joined the group last fails, the first member to join the list is assigned as the recover leader. Thus, a chronological succession mechanism may ensure that the same member is selected as recovery leader for a failed member regardless of which member performs the determination.

In multiple, interdependent failure scenarios, a group member that would have been selected as recovery leader may experience a failure during the recovery leader selection process and prior to the actual determination that it would have been selected as recovery leader for a previously failed member. For instance, server 1 may fail and during the recovery leader selection process, server 2, which may have been selected as the recovery leader, may also fail. In response to a notification that server 2 has failed, the other members of the group may select another member, such as server 3 to recover for server 2.

Once recovery leader selection has been performed and recorded, the GMS client applications co-resident with the selected instance may be provided a signal to initiate recovery operations, according to some embodiments. The received signal may include the ID of the failed member and may also include failure chain (or cascade) information about any member(s) for which the failed instance was performing recovery. In some embodiments, the recovery state field 850 for each failed member may indicate "RECOVER IN PROGRESS", as illustrated in FIG. 8 for server 2.

In order to receive the signal, GMS clients may implement and/or expose APIs or interfaces. For example, in one embodiment, GMS clients may implement a FailureRecoveryAction and a FailureRecoveryActionFactory interface. Client applications may register their particular implementation of FailureRecoveryActionFactory with the GMS either before or when joining the group. When a particular member is selected as the recovery leader, the registered component associated with that particular instance may be sent the signal to initiate recovery operations. In one embodiment, this signal may be a programming or data object (such as of type FailureRecoverySignal) that may be delivered via an exposed interface, such as by calling a method of the registered FailureRecoveryActionFactory. The called method may create an object of type FailureRecoveryAction in that instance. A consumeSignal( ) method of the FailureRecoveryAction object may be called to deliver the FailureRecoverySignal.

Information regarding a failure chain may be represented in an object and may include a sequential list of members upon whom another member is performing recovery. For example, if member A of a group experiences a failure and member B initiates a recovery action for A, and while B is executing the recovery action for A, B itself fails, then member C may be selected to recovery for B and A. The failure recovery signal given to member C upon its selection as recovery leader for member B may include data that indicates not only the failed member identification for member B, but also an object including the identification for member A, for which B was performing a recovery action when B experienced its own failure. This object may be referred to as a failure chain object, and may include information from distributed state cache 800 such as name and/or ID of the most recently failed member and an ordered list of the names and/or IDs of previously failed members for whom the most recently failed member was recovering when it failed.

Thus, in some embodiments, the failure chain object may provide an assigned recovery leader access to information regarding the recoverable resources for one or more failed members. The failure chain object may include the information necessary to either recover all the failed members in the failure chain or for inform a group administrator that manual recovery actions should be performed, according to certain embodiments.

Figure 9:
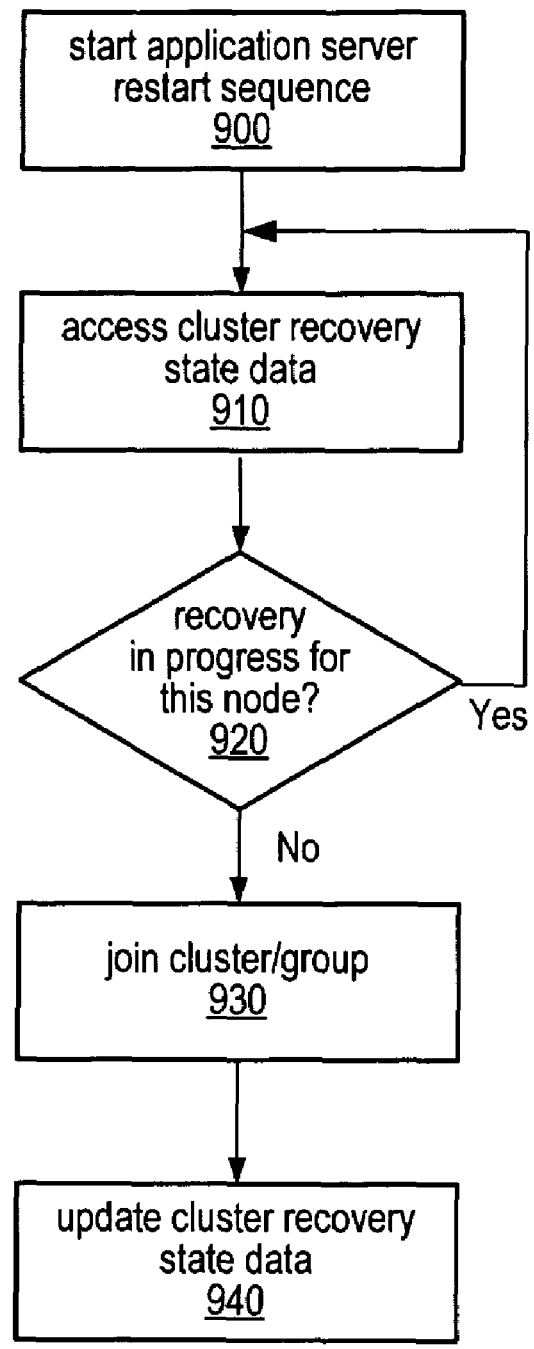
FIG. 9 is a flowchart for a group joining protocol, according to one embodiment.

FIG. 9 is a flowchart illustrating one embodiment of a method for joining a cluster group that may be observed/by all servers in conjunction with distributed state cache 800 described above. In some embodiments, the method illustrated by FIG. 9 may be implemented anytime a server undergoes a start up or a restart, as illustrated by block 900. The GMS module of the server intending to join the cluster may read the cluster state table from commonly accessible storage, as shown in block 910, to determine whether the "gate" is open for it to join, as indicated by decision block 920. If the server finds its designation in any position in the "recovering for" column of the cluster state table, then recovery operations are being performed for it and its gate is closed. If recovery operations are being performed for a node that desired to join the group, it may begin monitoring the cluster state table for updates. When the server's designation does not appear anywhere in the "recovering for" column of the cluster state table, the gate is open and the server may attempt to join or rejoin the cluster, as illustrated at block 930. When the server has successfully joined the cluster, it may update the cluster state table by updating the cluster state table to indicate that it has joined and at what time it joined, as indicated in block 940.

In some embodiments, the server may be allowed to startup some of its functionality that is not dependent upon cluster participation even if the cluster state table indicates that the gate is closed for joining the cluster. Once any outstanding recovery actions for the server have completed (e.g. the gate opens) the server may complete startup of cluster dependent functions/applications and attempt to rejoin the cluster.

In one embodiment, each server may be configured not to attempt its own recovery. When it joins the cluster it may be treated as an entirely new member with newly assigned tasks. Under these scenarios, failure fencing by the GMS may be unnecessary since a restarting server will not attempt to duplicate a recovery that may already be underway.

Figure 10:
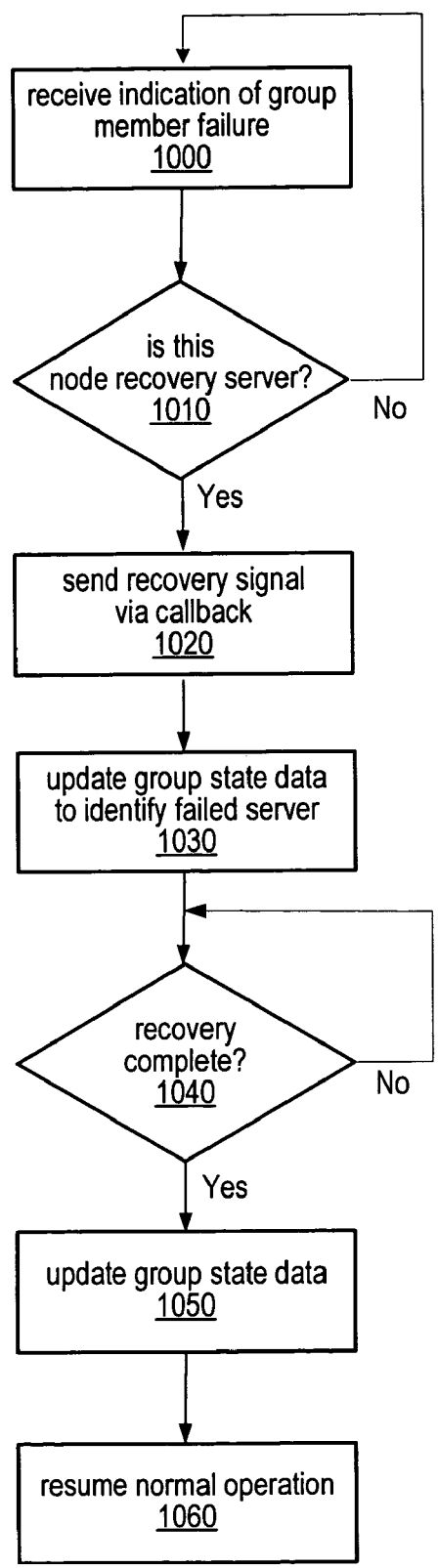
FIG. 10 is a flow of a method for GMS module operation including administration of a commonly accessible cluster state data table, according to one embodiment.

FIG. 10 is a flow of a method for GMS module operation including administration of commonly accessible group state data, according to one embodiment. At block 1000, the GMS modules may receive notification of the failure of a group member. In one embodiment, this notification may include an ordered view of the current group membership. For example, if a group includes three nodes A, B, and C, and all the nodes are functioning, a view may contain the ordered list "abc". If node B fails, a subsequent view might contain the ordered list "ac" indicating that node B is no longer a member of the group. As described above, in one embodiment, the group membership view may be ordered according to the respective join times of the group members. As shown in decision block 1010, the GMS module may use the designation of the fail server and the ordered list from a view received prior to the server failure to determine whether it needs to initiate failure recovery activity. Continuing the previous example, if the ordered list of the latest view indicates that node B has failed, the GMS module may refer to the ordered list of a previous view to determine which node is next in the ordered list. Since "C" may immediately follow "C" in that ordered list, the GMS of node C may determine that it needs to initiate recovery action for node B. Block 1020 indicates that the GMS may initiate recovery action for the failed group member, such as by invoking a callback method and passing a signal object, as described previously. Please note that while the above description uses letters to indicate group members, any suitable method of identifying group members may be utilized in various embodiments.

The GMS module may modify the group state data by deleting the entry in the "member name" column corresponding to the failed server and storing the failed server's designation in the "recovering for" column corresponding to its own node, as indicated in block 1030. Additionally, when the recovery process has completed its recovery action, as indicated at block 1040, the GMS module may modify the group state data by deleting the entry in the "recovering for" column corresponding to the failed server, as shown in block 1050. Removing this entry from the group state data may allow the failed server to rejoin the group when it is restarted. After updating the group state data, the GMS module may resume normal operation, as indicated by block 1060.

The recovery processes and methods described above with respect to member servers of a server group may be generalized and extended to groups of cooperating systems experiencing both independent and interdependent failures. Groups of cooperating systems may be realized in software, e.g. processes or operating system, or in hardware, e.g. CPUs. An interdependent failure may occur when a failure has already occurred and another group member is attempting to perform recovery for the failed member. A group management service (GMS) module may provide the means to select one of the surviving members of the group to perform recovery operations on a single failed member of the group or on a chain of interdependently failed members as described herein.

In one embodiment, GMS may make use of a chronological successor mechanism to determine the surviving group member that is to attempt recovery for a failed member or failure chain. The chronological successor mechanism may make use of information stored in the group state data or in an identically ordered copy of the group membership list maintained by each GMS module. The ordering of the group membership list may be based on the time at which each member joined the group. For example, the member of the group who is chronologically next to (joined the group immediately subsequently) to the failed member may be selected as a recovery leader for performing recovery operations on the failed group member. When the newest member of the group experiences a failure, the chronological successor mechanism may select the oldest group member to become the recovery leader. In some embodiments, the group membership list may be maintained as a linked list in which an entry for each member M is linked to the member that joined the group immediately prior to M's joining and also to the member that joined the group immediately subsequent to M's joining. The list entry for the latest member to join the group may also be linked to that of the first member to join the group, in one embodiment. In other embodiments, the group membership list may be maintained as a table relating a particular group member with the time at which that member joined the group.

The chronological successor algorithm may be advantageous in its relative simplicity. Once a failure notification has been received, group communications are not required during selection of a recovery leader as might be the case with voting type mechanisms, according to one embodiment. Since GMS group communications may ensure that each group member always has an identically ordered copy of the group membership list, and the chronological successor algorithm may be run with only this information, each GMS instance is assured of selecting the same recovery leader for a particular failure occurrence. In other words, the same recovery leader may be selected regardless of which GMS instance is performing the selection, according to some embodiments.

When a failure is detected by the group communications package (e.g. JGroups group communication toolkit) as described previously, an updated view of the reconstituted group membership may be delivered to all group members. In one embodiment, this view may include a list of group members ordered in chronological succession by their respective join times. When a view update is transmitted, each instance of the GMS may cache the previous version for comparison and difference determination. For example, by comparing a received group membership update with its immediate predecessor, a newly failed or joined member may be determined.

Figure 11:
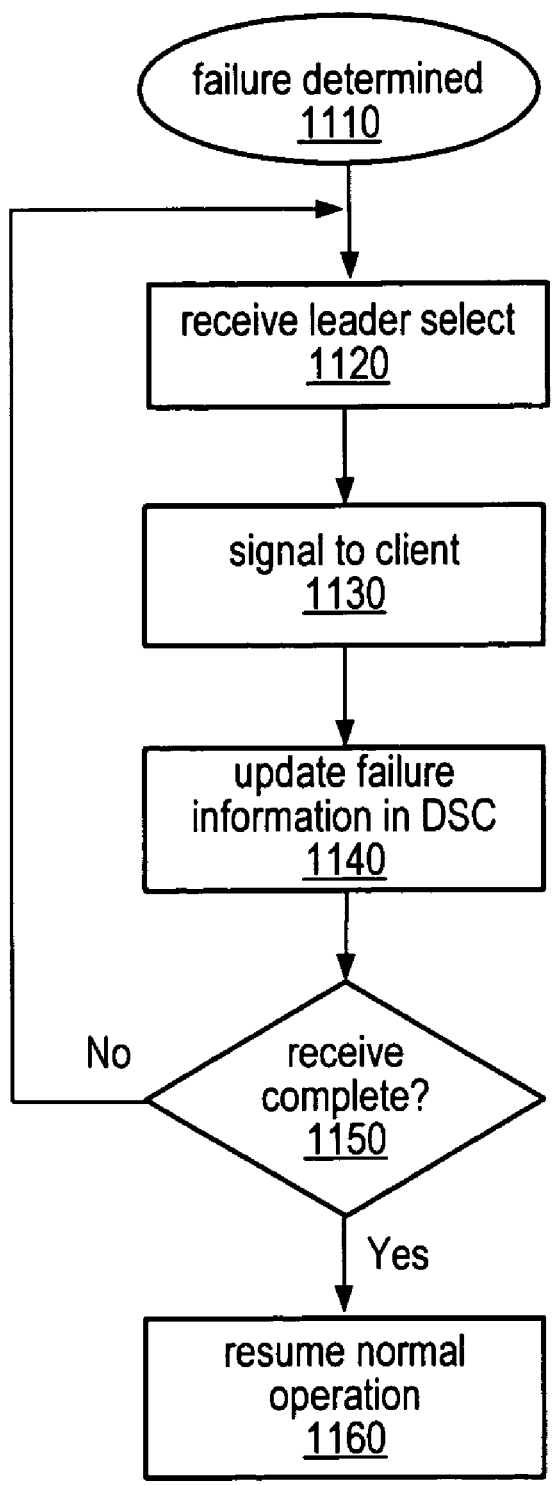
FIG. 11 is a flowchart illustrating one embodiment of a method for recovering a failure chain, according to one embodiment.

FIG. 11 is a flowchart illustrating one embodiment of a method for recovering a failure chain. The GMS may determine that a member failure has occurred, as illustrated by block 110 and described previously. As shown in block 1110, each GMS instance may run a recovery leader selection algorithm, such as the chronological succession algorithm, to determine whether a client component in the associated member should take recovery actions. A FailureRecoverySignal may be sent to the appropriate client application in the member selected as the recovery leader, as shown in block 1130, according to one embodiment. The FailureRecoverySignal may include a failure chain object in the case of interdependent member failures. When the client application has executed one or more recovery actions, it may inform the corresponding GMS instance, which may in turn update the appropriate failure chain information in the distributed state cache, as indicated by block 1140. At decision block 1150, the GMS may determine whether all links in the failure chain object have been recovered and if so, may terminate its recovery procedure. As described above, the links in a failure chain object may represent the failed group members. Thus, when all links have been recovered, recovery operations for all the failed nodes may have been successfully completed, according to one embodiment. However, if the GMS determines at decision block 1150 that non-recovered links still exist in the failure chain (and thus recover operations may still be required for one or more group members), it may return to block 1120 for the selection of a new recovery leader for the remaining links. Otherwise, the GMS may resume normal operation, as indicated by block 1160.

The failure chain object may allow a group member to use its own order in accessing the individual links in the chain. In one embodiment, when a recovery application accesses a link in the failure chain, the application may receive the original member details associated with that link, such as the failed member identification and the location of the transaction log for the failed member. By using this information, the recovery application may process the recovery for the failed member associated with that particular link in the failure chain. Once a link is chosen for recovery, the recovery state information pertaining to that link may be updated in the distributed state cache so that future failure chains may include current information about the state of this recovery process. For example, if an application recovers a certain number of links in a particular failure chain and then stops its recovery actions, other group members may be notified of the partially completed recovery, and another member may perform recovery for the remaining links.

In order to ensure that the GMS mechanism described above may properly handle the effects of interdependent member failures, group members may be required to perform certain actions. In one embodiment, when a GMS client component is initializing, the associated client application should call the failure fencing API provided by the GMS to determine whether the member that it represents is currently being recover for a previous failure. The relevant API call may be, for example GroupHandle.isFenced( ). Also, when the GMS client is given a FailureRecoverySignal, that client should use methods of the failure fencing API. Failure fencing may ensure that the resources of a particular member are not operated on by more than one member at a time. When performing recovery for another instance, the client may indirectly raise the fence by calling the acquire( ) method of the FailureRecoverySignal and lower it by calling the release( ) method of the FailureRecoverySignal.

When a group member elects to perform self-recovery, that client may raise a fence to protect the recovery operation that it is to perform on itself from contention by other members who may have observed the earlier failure and who may attempt to initiate recovery operations. In one embodiment, an API to call for raising such a fence may change the recovery state in the distributed state cache for the particular recovery operation from, for example, RECOVERY_SERVER_APPOINTED to RECOVERY_IN_PROGRESS. When the recovery operation is complete, the self-recovering client may lower the fence so that the group informational state associated with that recovery may be updated. In one embodiment, an API to call for lowering the fence may remove the entry for the particular recovery operation from the distributed state cache.

Figure 12:
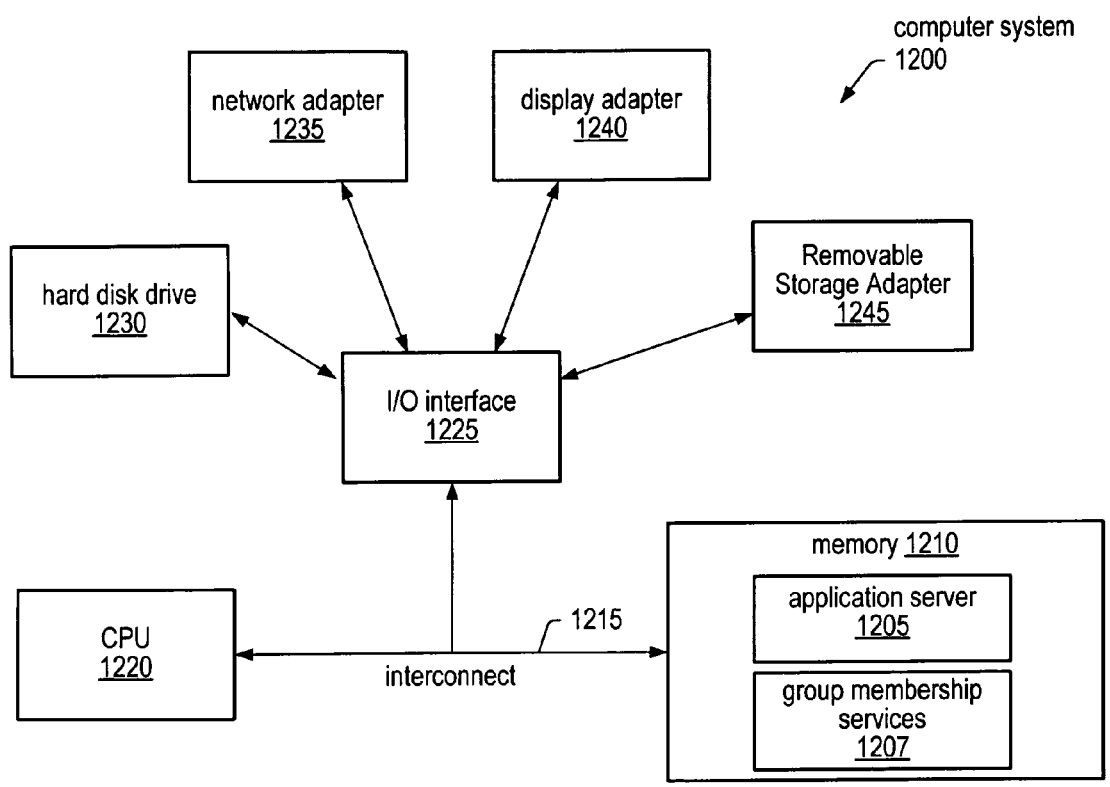
FIG. 12 illustrates one embodiment of a computer system that may include a GMS module and an application server.

FIG. 12 illustrates one embodiment of a computer system 1200 that may include a GMS module 1207 and an application server 1205. Computer system 1200 may be a node in an application server cluster or a member of another group of cooperating processes. Computer system 1200 may include many different components such as memory 1210, a central processing unit (CPU) or processor 1220, and an input/output (I/O) interface 1225. Interconnect 1215 may be relied upon to communicate data from one component to another. For example, interconnect 1215 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1200 preferably includes a memory medium on which computer programs and/or computer program instructions may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1330, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution. Memory 1210 may store program instructions accessed by the CPU 1220. For example, instructions and data implementing an application server 1205 and group management services 1207 may be stored in memory 1210. Application server 1205 may utilize the functionality provided by GMS modules 1207. In some embodiments, memory 1210 may include program instruction configured to implement detection and recovery of failure chains in a group of cooperating systems, as described herein.

Additionally, computer system 1200 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++, Java, C#, ASP, Visual Basic, JavaBeans, Microsoft Foundation Classes (MFC), Microsoft .NET, Microsoft Active Template Library (ATL), or other technologies or methodologies, as desired.

Computer system 1200 may further include other software and hardware components, such as an input/output (I/O) interface 1225, that may be coupled to various other components and memory 1210. The CPU 1220 may acquire instructions and/or data through the I/O interface 1225. Through the I/O interface 1225, the CPU 1220 may also be coupled to one or more I/O components. As illustrated, I/O components may include a hard disk drive 1230, a network adapter 1235, a display adapter 1240 and/or a removable storage adapter 1245. Some components 1230 to 1245 may be coupled to the I/O interface 1225. In addition, the computer system 1200 may include one or more of a particular type of component. The computer system 1200 may include one or more components coupled to the system through a component other than the I/O interface 1225. Some computer systems may include additional and/or other such as application software (e.g., stored in memory 1210), other CPUs, video monitors or other displays, track balls, mice, keyboards, printers, plotters, scanners, or other types of I/O devices for use with computer system 1200.

The various methods as illustrated in the figures and described herein represent exemplary embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of cooperating computer nodes, wherein the plurality of nodes are configured to cooperate as a group according to a group management services protocol, and wherein each node comprises a group management service (GMS) module;
   wherein in response to detecting that one of the plurality of nodes failed, wherein the failed node was performing recovery operations for a previously failed node when it failed, each GMS module is configured to:
   select one of the plurality of computer nodes to perform recovery operations for the failed node;
   update group state data, accessible to each respective GMS module, to indicate the selected node as selected to perform recovery operations for the failed node, wherein the group state data comprises information regarding the recovery state of each of the plurality of nodes; and
   wherein the GMS module on the selected node is further configured to request a client process executing on the selected node to perform the recovery operations for the failed node.

2. The system of claim 1, wherein the GMS module on the selected node is further configured to update the group state data to indicate the recovery operations are in progress for the failed node.

3. The system of claim 1, wherein in response to receiving from the client process an indication of the completion of the recovery operations for the failed node, the GMS module on the selected node is configured to update the group state data to indicate completion of the recovery operations for the failed node.

4. The system of claim 3, wherein the client process is further configured to perform recovery operations for the previously failed node and wherein in response to receiving from the client process an indication of the completion of the recovery operations for the previously failed node, the GMS module on the selected node is configured to update the group state data to indicate completion of the recovery operations for the previously failed node.

5. The system of claim 3, wherein as part of updating the group state data to indicate completion of the recovery operations for the failed node, the GMS module on the selected node is further configured update the group state data to indicate non completion of the recovery operations for the previously failed node.

6. The system of claim 1, wherein the GMS module on the failed node is configured to determine whether recovery operations are being performed for the failed node prior to joining the group.

7. The system of claim 6, wherein to determine whether recovery operations are being performed for the failed node, the GMS module on the failed node is further configured to access the group state data.

8. The system of claim 1, wherein to select one of the plurality of computer nodes to perform recovery operations for the failed node, each GMS module is configured to determine that the selected node joined the group after the failed node joined the group but before any of the other nodes joined the group.

9. The system of claim 8, wherein to determine that the selected node joined the after the failed node joined the group but before any of the other nodes joined the group, each of the GMS modules is configured to access join time information from the group state data.

10. A method, comprising:
- a group management service (GMS) module one of a plurality of computer nodes cooperating as a group according to a group management services protocol detecting that one of the plurality of nodes failed, wherein the failed node was performing recovery operations for a previously failed node when it failed;
- the GMS module selecting one of the plurality of computer nodes to perform recovery operations for the failed node;
- the GMS module updating group state data, accessible to each of the plurality of nodes, to indicate the selected node as selected to perform recovery operations for the failed node, wherein the group state data comprises information regarding the recovery state of each of the plurality of nodes; and
- a GMS module on the selected node requesting a client process on the selected node to perform the recovery operations for the failed node.

11. The method of claim 10, further comprising the GMS module on the selected node updating the group state data to indicate the recovery operations are in progress for the failed node.

12. The method of claim 10, further comprising the GMS module on the selected node updating the group state data to indicate completion of the recovery operations for the failed node in response to receiving from the client process an indication of the completion of the recovery operations for the failed node.

13. The method of claim 12, further comprising:
- the client process performing the recovery operations for the previously failed node; and
- the GMS module on the selected node updating the group state data to indicate completion of the recovery operations for the previously failed node in response to receiving from the client process an indication of the completion of the recovery operations for the previously failed node.

14. The method of claim 12, wherein said updating the group state data to indicate completion of the recovery operations for the failed node further comprises the GMS module on the selected node updating the group state data to indicate non completion of the recovery operations for the previously failed node.

15. The method of claim 10, further comprising the GMS module on the failed node determining whether recovery operations are being performed for the failed node prior to joining the group.

16. The method of claim 15, wherein said determining whether recovery operations are being performed for the failed node comprises the GMS module on the failed node accessing the group state data.

17. The method of claim 10, wherein said selecting one of the plurality of computer nodes to perform recovery operations for the failed node further comprises the GMS module determining that the selected node joined the group after the failed node joined the group but before any of the other nodes joined the group.

18. The method of claim 17, wherein said determining that the selected node joined the after the failed node joined the group but before any of the other nodes joined the group comprises the GMS module accessing join time information from the group state data.

19. A computer-accessible memory medium, comprising program instructions computer-executable to implement:
- a group management service (GMS) module one of a plurality of computer nodes cooperating as a group according to a group management services protocol detecting that one of the plurality of nodes failed, wherein the failed node was performing recovery operations for a previously failed node when it failed;
- the GMS module selecting one of the plurality of computer nodes to perform recovery operations for the failed node;
- the GMS module updating group state data, accessible to each of the plurality of nodes, to indicate the selected node as selected to perform recovery operations for the failed node, wherein the group state data comprises information regarding the recovery state of each of the plurality of nodes; and
- a GMS module on the selected node requesting a client process on the selected node to perform the recovery operations for the failed node.

* * * * *